(12) United States Patent
Haas et al.

(10) Patent No.: US 11,301,736 B1
(45) Date of Patent: Apr. 12, 2022

(54) PET TAG HAVING MACHINE READABLE INDICIA AND METHOD FOR MANUFACTURING

(71) Applicants: Kevin Haas, Ft. Thomas, KY (US); Brad Haas, Melbourne, KY (US)

(72) Inventors: Kevin Haas, Ft. Thomas, KY (US); Brad Haas, Melbourne, KY (US)

( * ) Notice: Subject to any disclaimer, the term of this patent is extended or adjusted under 35 U.S.C. 154(b) by 0 days.

(21) Appl. No.: 17/066,812

(22) Filed: Oct. 9, 2020

(51) Int. Cl.
*G06K 19/06* (2006.01)

(52) U.S. Cl.
CPC .............................. *G06K 19/06037* (2013.01)

(58) Field of Classification Search
CPC ................................................ G06K 19/06037
USPC .......................................................... 235/494
See application file for complete search history.

(56) References Cited

U.S. PATENT DOCUMENTS

| 2016/0142345 A1* | 5/2016 | Younani | H04L 51/04 |
| | | | 709/206 |
| 2016/0203276 A1* | 7/2016 | Castellano | G16H 40/20 |
| | | | 705/3 |
| 2018/0098523 A1* | 4/2018 | Basom | G06F 16/955 |

* cited by examiner

*Primary Examiner* — Daniel A Hess
(74) *Attorney, Agent, or Firm* — R. Christian Macke (57) ABSTRACT

A durable pet tag having machine readable indicia. A multiple layer label is pre-assembled and applied and embedded into a metal substrate for durability. A two sided pet tag having machine readable indicia on a first side and human readable indicia on a second side is provided, the human readable indicia being stamped into the side of the substrate opposite the machine readable printed sheet so that a single pet tag is provided with machine readable data to allow finders of lost pets to retrieve owner information using a smart phone and the database accessible with the pet tag machine readable indicia. The pet tag also has human readable indicia to comply with legal requirements.

5 Claims, 4 Drawing Sheets

PET TAG HAVING MACHINE READABLE INDICIA AND METHOD FOR MANUFACTURING

FIELD OF THE INVENTION

This application relates to pet tags and specifically to durable, mass produced pet tags having machine readable indicia securely and durably provided thereon.

BACKGROUND OF THE INVENTION

The use of a pet tag worn by a pet, most often a dog, is a very demanding use requiring a robust solution. Tags are worn by dogs for multiple reasons and, frequently, the use of multiple tags is employed to accomplish separate objectives. For example, a very common need for a dog tag is that it provide the information required for legal compliance. Tags that indicate the dog has gotten the legally required shots (typically the Rabies Vaccine) are statutorily required most places. These Rabies Vaccine tags generally comprise metal tags, stamp pressed with "human readable" indicia (alphanumeric characters" indicating veterinarian identifying information (name, address, phone number) for the veterinarian issuing the tag. In practice, a veterinarian generally acquires Rabies Vaccine tags in bulk, stamped with the veterinarian identifying information, as described above in human readable form. The tags also are stamped with a unique identifier (typically a 4 or 5 digit sequential number) that the veterinarian stores and maintains in a database to allow identification of the specific dog.

After vaccinating the pet, the veterinarian issues the tag, to be worn by the pet, for compliance, with ordinances and statutes requiring vaccination. The Rabies Vaccine tags thus are concerned with providing legal registration of the animal, but in addition, because they also include the contact information for the veterinarian, they also have served as aids in returning a lost dog. Typically, for example, when the "finder" of a lost dog sees the Rabies Vaccine tag on the dog's collar, the "finder" contacts the veterinarian identified thereon, and the vet either takes possession of the lost dog or provides the owner's contact information, such that the owner can be contacted by the "finder" to return the dog. This is not an ideal solution, and it would be preferable to have a system that allows the owner to be located by the "finder" without having to go through the veterinarian.

Prior art Rabies Vaccine tags are economically manufactured, in one specific example, with a stamp press and punch press method at high speed and low cost. Tags produced in this manner are provided to veterinarians in bulk, each tag having a "unique identifier" that the veterinarian can assign to each dog in a database maintained by the veterinarian pertaining to the dog. The tags and the "unique identifier" provide a record keeping device for the veterinarian (for information such as Rabies vaccination, records of other shots, diseases, whether the pet has been spayed or neutered) so that all of the pet's records can be accessed by the veterinarian by looking up the "unique identifier".

However, it is a challenging application for these tags, or anything worn or affixed to an animal, particularly a dog. It will be bitten, gnawed, tugged at, caught in fences, scratched, bent, deformed or pulled free from the collar. To meet the robust requirements of this application, a Rabies Vaccine Tag is provided on a metal substrate, blanks, stamped and punched with the veterinarian identifier information and the "unique identifier". These tags are manufactured at high speed and low cost, and meet the durability and ruggedness requirements of being worn on a collar, chewed on, tugged at, being caught and yanked on, or otherwise mangled in every possible way by a dog. They can withstand severe mistreatment and are still the most prevalent tag for legal compliance as Rabies Vaccine Tags.

The prior art Rabies Vaccine tags serve the function of notice regarding Rabies vaccination and compliance with statutes and ordinances, and the tags also identify the veterinarian issuing the tag (through which the pet owner can be located) while being durable enough to withstand the harsh requirements by being constructed from metal blanks stamped and punch pressed with human readable indicia. The stamped metal tags are manufactured at high speed and low cost with a traditional high speed stamp and punch press machine. However, these tags and this process have disadvantages and deficiencies. It is desirable to continue to use the traditional high speed punch press machine to manufacture pet tags while also providing a facility to include machine readable indicia on the pet tags as well.

Recent methods of manufacturing and of storing and accessing data have affected the nature of pet tags, in part by the desire to have the owner immediately identifiable from the tag. These recent methods creating pet tags include processes and equipment to create tags that are printed, embossed, or laser etched on widely varying substrates, including plastics and metals. Types of indicia that can be printed, stamped, embossed or laser etched on the tag include both human readable data (letters and numbers, e.g. owner name, address, phone number, etc.) and machine readable indicia (e.g. bar code or Quick Recall (QR) code) thereon. In particular, tags that printed or laser etched are well known to be provided with machine readable indicia, bar codes or QR codes.

It is known in the art that dog tags can be individually produced (printed, stamped, engraved, pressed, embossed) to a user's specifications, including providing human readable indicia and machine readable indicia. It is also known that modern methods of printing and laser etching, discussed herein, are used to create dual sided and single sided tags bearing both forms of indicia. However, the production of such tags has not replaced the durable and inexpensive stamped and punched Rabies Vaccine tags for a variety of reasons. First, it remains the function of veterinarians who actually perform vaccinations to provide the legally required Rabies Vaccine tags as proof that the dog has been vaccinated. The Rabies Vaccine tags are necessary for registration of the dog, and veterinarians still use the stamped and punched metal tag for the Rabies Vaccine tag. The stamped and punched metal tags are not individually designed, but rather are acquired in bulk by veterinarians for issuance. Stamped and punched metal tags thus are preferable for veterinarians who issue the tags to the individually designed and specified tags, having printed or laser etched indicia thereon, in a number of ways. Generally, printed or laser etched tags are made from a lighter substrate material and lack the durability and are prone to fail when subjected to the harsh requirements of being on a dog collar for a year or more. In addition, the individualized specification necessary for each printed or laser etched tag is not done in a veterinarian's office because veterinarians do not have the machine or equipment to print, etch or emboss a substrate in the office, so individual tags are not done by a veterinarian. Thus, while methods and devices exist to create individualized tags for a dog, they are not provided by a veterinarian and cannot, therefor, serve as a Rabies Vaccine tag.

In addition to the fact that a veterinarian can not create or issue an individual tag, there is a stark difference in cost and time to manufacture a laser etched tag versus the traditional stamped and punched tag in that the time that it takes to generate a laser etched tag is generally estimable at 20 seconds per tag as compared to less than 1 second to produce a stamped and punched metal tag. As a result of the increased production time and complexity, printed and laser etched tags are many times more expensive than the stamped and punched metal tags. Dog tags produced with recent technology are attractive and certainly very customizable. There are myriad businesses that will create dog tags online to an owner's specifications. However, they are more expensive, less durable and not issued through a veterinarian's office and, therefore will not function as a Rabies Vaccine tag. Printed and laser etched dog tags exist in the market and provide owner information allowing the dog to be returned to the owner. However, they do not replace the stamped and punched Rabies Vaccine tag issued by veterinarians. The stamped and punched metal tag provided by the veterinarian will still need to be procured for legal registration and compliance.

It is desirable to provide inexpensive dog tags that can be created using traditional high speed manufacturing methods and provided in bulk to veterinarians for use as Rabies Vaccine tags that also have machine readable indicia durably provided thereon. A high speed method for producing stamped and punched metal tags having machine readable indicia thereon in also desirable.

In the field of pet tags and dog tags, as well as many other endeavors, it is desirable to affix machine readable indicia (e.g. bar codes or QR codes) to the tags because the machine readable indicia can be used to access a vast amount of data electronically that could not possibly be printed or provided in written form on the tag. The most prevalent machine readable indicia are QR (Quick Response) codes, the ubiquitous square matrix barcodes found on items that have become recognizable and functional among consumers, due in large part to the popular use of smartphones to recognize QR codes. A QR code is a two dimensional series of black squares on a white background arranged in a square grid. These codes, like other codes such as bar codes, may be printed or laser etched into a surface.

In the specific application to pet tags, a QR code can be a valuable tool to provide information about the pet including owner information so that the pet can be returned. An owner with a pet registers the pet information owner name, address, vaccines, etc.—and that information is maintained and associated with a specific QR code by a database administrator. Then when a pet becomes lost, the QR code applied to a tag to allows a user scanning the QR code with his/her phone to access the information maintained by the database administrator about the dog or pet wearing the tag. The use of QR codes on pet tags provides an efficient way to return lost pets to their owners, by allowing anyone by allowing anyone finding a lost pet to access information about the pet by scanning the QR code with a smart phone. Scanning the QR code takes the finder to a database where the pet owner information is stored. The finder can then contact the owner and the pet is returned. It is an effective device and method for reuniting pets with their owners, and the use of QR codes on pet tags is unquestionably a valuable tool.

Unfortunately, the prior art use of QR codes on pet tags suffer from a number of disadvantages related to the methods for applying a QR code to a pet tag. If the QR code is, for example, printed directly onto the pet tag or even thinly etched onto the tag, under the harsh conditions of the tag being bitten, chewed on, scratched at, caught on something or otherwise mangled, there is a high probability that the QR code (comprising small black squares on a white background) will be compromised. In addition, if a QR code is first printed on an adhesive label and applied to the tag, it too will have a high failure rate, either because the label adhesive fails and the label either completely or partly peels off the tag, or because the printed label bearing the QR code is compromised as a result of being scratched, bitten, or mangled in the harsh conditions of being on a dog tag.

The present invention has addressed these disadvantages, as set forth in more detail herein, by providing a pet tag that is formed from a stamped and punched metal substrate, has human readable indicia on one side, required for the tag to be Rabies Vaccine compliant, while having machine readable indicia such as a QR code on the other side that is applied in such a way that the QR code is durable, protected and reliable for the life of the tag. The inventive tag uniquely combines the traditional stamped and punched Rabies Vaccine tag with QR codes so that only one tag will be required for compliance with legal requirements while also having provisions to access extensive information about the pet and owner.

In addition, the mechanical manufacturing problems and limitations of the prior art are addressed and solved by the present invention. A specific limitation of Rabies Vaccine tags that are mass produced and provided inexpensively and in bulk to veterinarians (with the veterinarian information and a unique identifier on each tag, stamped by a high speed press onto the metal substrate), is that the inclusion of other indicia (such as a QR code) particular to a specific pet/dog requires customization of the tag, whether by printing or laser etching. The veterinarian office receives the "official" stamped and punched metal Rabies Vaccine tags and issues them after performing the vaccination, recording the "unique identifier" on the tag. The veterinarian office is not in the business of printing or etching other indicia (name, address, phone, etc.) onto a tag so typically an owner will procure the "official" Rabies Vaccine tag from a veterinarian and a second, customized tag with owner information printed or etched thereon separate from the Rabies Vaccine tag. This is problematic for several reasons. First, the second tag is generally lighter and less durable and cannot withstand the harsh treatment it receives and fails. In addition, the harsh conditions to which the tag is subjected makes the addition of a second tag, that will clank against the Rabies Vaccine tag and cause additional entanglements, increase the likelihood of failure. The present invention alleviates this problem by providing a single pet tag that durably provides both the human readable and machine readable information previously requiring two tags, while remaining inexpensive and capable of high speed production.

It is desirable to provide pet tags that can be produced at high speed that have the information necessary for them to function as Rabies. Vaccine tags while also providing indicia such as QR codes that provides access to information about the owner, in case the pet runs off becomes lost. It is also desirable to adapt the present high speed stamp and punch method and devices for manufacturing veterinarian issued Rabies Vaccine tags such that the tags also provide owner location indicia without affecting the high speed production. The prior art process comprises feeding a loop of metal substrate in sheet form into a stamp and punch press at high speed, then press stamping it with veterinarian and a "unique identifier" indicia, then punching the tag out of the stamped sheet as the final tag. As set forth in more detail herein, the present invention adds additional equipment and procedures that allow the application and embedding of a label with a QR code thereon to the to the high speed stamping and punching of the metal substrate. Significant problems had to be overcome to arrive at the present invention, including precision registration and placement of the label application step within the process, providing equipment to make the label durable and protected from being compromised, and allowing for deformation of the metal substrate when stamped such that the label is not affected. The desirable end result of this inventive pet tag manufacturing process is a Rabies Vaccine tag, mass produced to veterinarians, that also has machine readable indicia such as a QR code thereon that allows a finder of a lost dog to access owner data and effect a return of the dog to the owner without the involvement of the veterinarian.

As set forth in more detail herein, a durable pet tag having both human readable and machine readable indicia is provided wherein the human readable indicia is provided using a traditional deep press stamping onto a metal substrate. Machine readable indicia is provided as a printed label that is adhesively applied and subsequently pressure embedded into the metal substrate. The machine readable indicia printed on a label has a protective coating and an adhesive layer that protects the printed machine readable indicia from being damaged from above or below. Embedding of the label into the metal substrate prevents the corners or edges of the label from being peeled away from the substrate.

The methods and apparatus of the present invention, as set forth in more detail herein, allow pet tags and dog tags to be procured from a veterinarian at the time the vaccination is performed, while adding the value to the tag of machine readable indicia (a QR code) on the tag. The QR code is then used by the owner to create and store data for the pet in a database that can be accessed by a device such as a smart phone in the event the pet runs away or becomes lost. This method and apparatus allows the veterinarian to continue to issue the "official" Rabies Vaccine tags in the traditional manner, immediately upon the visit and vaccination of the pet because the veterinarian can purchase stamped and punched pet tags, as in the prior art, but with the additional benefit of including a QR code thereon. A pet database is then accessible to the owner, using the QR code provided on the tag to register and store information about the pet, including owner information. After the pet is registered the data will be accessible to anyone scanning the QR code with a smart phone, so that the owner information can be accessed and the pet returned by a "finder" without having to contact the veterinarian identified on the tag.

OBJECTS OF THE INVENTION

It is an object of the present invention to provide a pet tag that is compliant with legal licensing criteria while still providing information to allow a pet to be returned without a veterinarian involvement.

It is another object of the present invention to provide a durable pet tag that has human readable and machine-readable indicia.

It is yet another object of the present invention to provide a durable pet tag that can be manufactured at high-speed.

It is another object of the present invention to provide a durable pet tag that provides database access with a smart phone to retrieve data if the pet becomes lost.

It is yet another object of the present invention to provide a tag for a pet that is distributed and issued by veterinarians to comply with vaccination requirements and has machine readable indicia there on.

It is yet another object of the present invention to provide a pet tag comprising a stamped and punched metal tag that has machine readable indicia as part of the tag.

SUMMARY OF THE INVENTION

The present invention is a pet tag comprising a durable, substantially flat substrate with machine readable indicia placed upon it. It is manufactured in a high speed process and, in the most preferred embodiment, the flat substrate is metal and the machine readable indicia is a QR code that is first printed on a label and then affixed to the substrate. In affixing the label to the substrate, an aggressive adhesive is used and a compression force is applied in the manufacturing process to embed the label into the substrate.

The label of the preferred embodiment is engineered and comprises multiple layers including a printed sheet comprising a sheet of polyester with a top side and the bottom side. In the most preferred embodiment, the polyester sheet has a thickness between 0.001 and 0.0025 inches. A second layer of the label comprises an aggressive adhesive of a thickness between 0.0010 and 0.0030 inches. Another layer of the label is a protective layer secured to the top side of the printed sheet, this protective layer being, in the most preferred embodiment, a sheet of Lexan between 0.002 and 0.005 inches thick. The protective layer of Lexan is secured to a top side of the printed sheet of polyester with a transparent layer of adhesive having a thickness of between 0.0010 and 0.0015 inches.

In the most preferred embodiment of the present invention, the label is manufactured prior to being applied to the metal substrate and is retained on a nonstick roll of tape such that, as the tape is unrolled, the label is removed from the tape and affixed to the metal substrate in the high speed manufacturing process.

Further, a durable pet tag is disclosed as the present invention comprising a substantially flat substrate having a first side and a second side, with machine readable indicia placed upon the substrate in a high-speed manufacturing process. Human readable indicia is also placed upon the substrate. In the most preferred embodiment of the present invention, the durable pet tag has a metal substrate and the machine readable indicia is a QR code that is printed on the label and affixed to the metal substrate.

Further, the label described as part of the durable pet tag is first affixed to the metal substrate with an aggressive adhesive and subsequently subjected to compression force to embed the label into the substrate. The label itself comprises multiple layers, a first layer being a sheet of polyester with the top side and the bottom side and a thickness between 0.001 and 0.0025 inches. A second layer comprises an aggressive adhesive of thickness between 0.0010 and 0.0030 inches. The most preferred embodiment of the durable pet tag of the present invention also has a protective layer secured to the top of the polyester sheet, the protective layer being a sheet of Lexan of between 0.002 and 0.005 inches thickness. The multiple layer label included as part of the durable pet tag of the present invention is manufactured prior to its application to the metal substrate. The labels are provided on a nonstick roll and affixed to the metal substrate with the aggressive adhesive as part of a high-speed manufacturing process. The application of the label to the substrate is accomplished by removing the label from a roll of tape prior to application of the compression force embedding the label into the metal substrate. In the most preferred embodiment of the present invention, the durable pet tag second side is stamped with human readable indicia.

A method for producing pet tags is also embodied in the present invention, wherein the method specifically comprises the step of first providing sheet metal substrate on a continuous roll that is then threaded through a tag producing machine. A continuous roll of pre-printed labels is provided for application to the metal substrate, the pre-printed labels being pressed onto the metal substrate such that they are embedded in the metal substrate. The next step in the inventive method is the stamping of human readable indicia onto the substrate on the side opposite the applied label. The pet tag is then punched out by a punch press, the individual tag bearing human readable indicia on one side and an embedded label on the opposing side.

Further, the present invention provides a method for returning lost pets to owners including the first step of providing a pet tag with human readable edition on one side comprising legally required information regarding the pet. The pet tag also provides for machine readable indicia on a second side. The method for returning lost pets also includes the step of providing a website and accessible database that receives and stores pet owner information. A smart device application program is provided that recognizes the machine readable indicia on the pet tag. The inventive method also includes the step of accessing pet owner information at the database and communicating the data to a smart device and displaying owner information to the "finder" of lost pet. The "finder" that procures the owner information pertaining to the lost pet with a smart device is then able to contact the owner for a return of the pet.

DETAILED DESCRIPTION OF THE INVENTION

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention and is made merely for the purpose of providing a full and enabling disclosure of the present protection. The detailed disclosure herein of one or more embodiments is not intended, nor is to be constructed, to limit the scope of patent protection afforded the present invention, which scope is to be defined by the claims and the equivalents thereof. It is not intended that the scope of the patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods are not limited to being carried out in any particular sequence or order, absent an indication otherwise. Indeed, the steps in such process or methods generally may be carried out in various different sequences and orders while still falling within the scope of the present invention. Accordingly, it is intended that the scope of the patent protection afforded the present invention is to be defined by the appended claims rather than the description set forth herein.

Figures 2A, 2C:
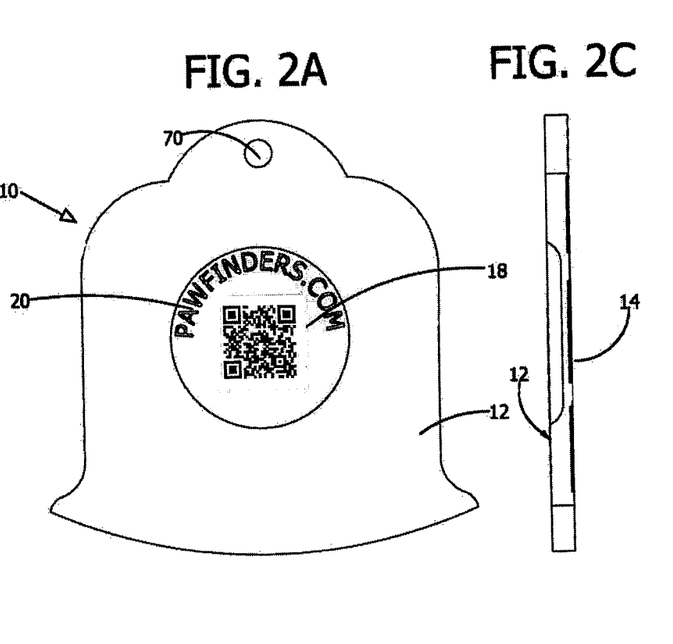
FIG. 2A is a front view of a first side of a durable pet tag reflecting the machine readable, QR code on the tag.
FIG. 2C is a sideview of the durable pet tag, illustrating the two sides of the tag and indicia on both sides.
Figure 2B:
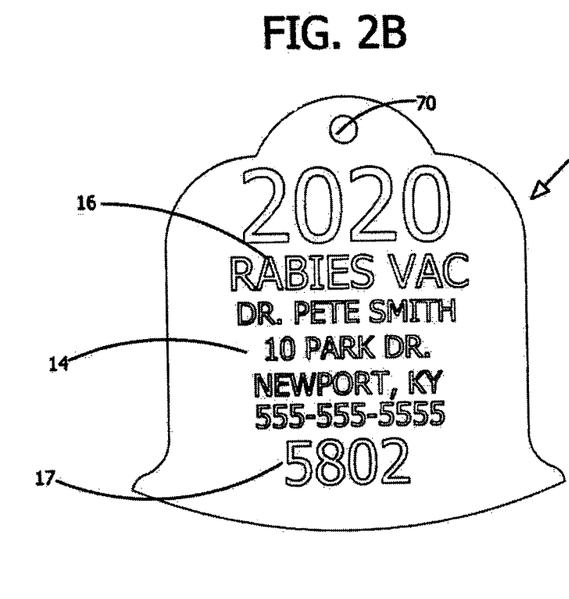
FIG. 2B is a rear view of the second side of a durable pet tag, showing the human readable indicia of the tag.

The present invention, as shown in the drawings utilizing reference numbers, addresses the limitations and disadvantages of the prior art. Specifically, a pet tag 10 in accordance with the principles of this application, is shown in FIGS. 2A, 2B, 2C. It is a dual sided tag formed from substrate 11 having a first side 12 and a second side 14. The pet tag 10 has human readable indicia 16 comprising alphanumeric characters on the second side 14 and machine readable indicia 18 on the first side 12. As discussed in more detail herein, The human readable indicia 16 has a "unique identifier" 17 used for record keeping purposes by the veterinarian identified on the tag 10. The machine readable indicia 18 comprises a bar code or QR code, recognizable by smart phones or other devices having provisions for interpreting such data. It is specifically contemplated by the inventors that other machine readable indicia, logos, characters, symbols, etc., that are interpreted by a communication device and directs, leads, links, or otherwise provides a path to data transfer or accessibility constitutes machine readable indicia for purposes of the present invention.

Figure 1:
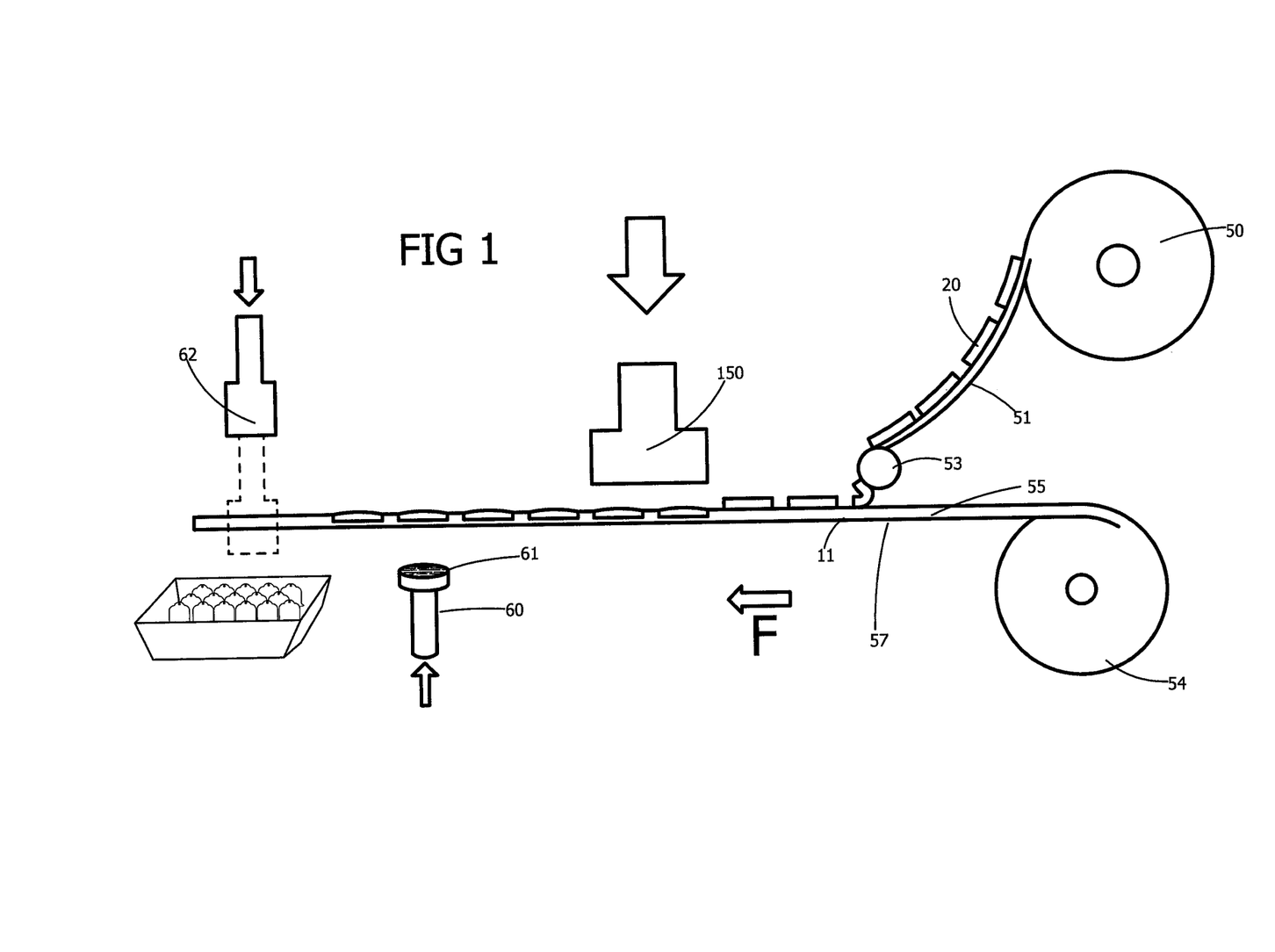
FIG. 1 is a schematic representation of the high-speed manufacturing process for making two sided durable pet tags.

In a significant aspect of the present invention, the machine readable indicia 18 is initially provided on an adhesive backed printed label 20 that is later applied to the first side 12 of the pet tag 10 in the following manner. In the most preferred embodiment of the invention, the label 20 is circular in shape and the machine readable indicia 18 comprises a QR code. Other shapes for the label 20, including without limitation ovals, polygons and semi circles, as well as other machine readable indicia, including without limitation, barcodes, logos, characters or symbols, are contemplated and do not depart from the principles of the present invention. Regardless of the shape of the label 20, for accurate registration and positioning onto a substrate material 11, discussed in more detail herein, the label 20 is removably provided, prior to application to the substrate material 11, on a sheet of nonstick tape 52 wound on a roll 50. The labels 20 are oriented on the tape 52 such that, as the tape 52 is unwound as shown in FIG. 1, the label 20 readily peels away from the tape 52 and is accurately positioned per registration onto the substrate material 11 as the tape 52 is fed around a separation roller 53.

Figure 3:
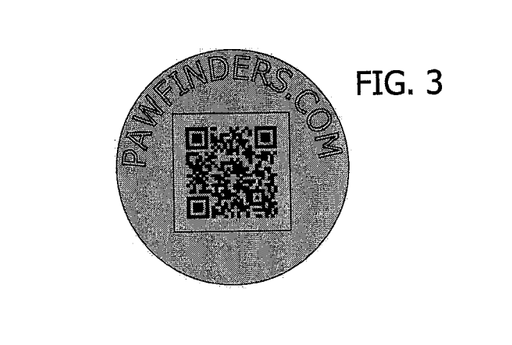
FIG. 3 is an illustration of a typical circular label having indicia printed thereon.
Figure 3A:
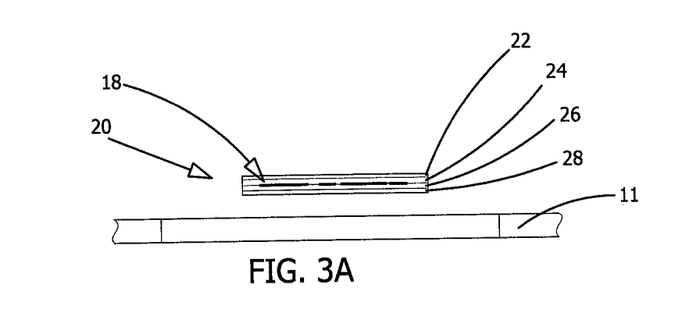
FIG. 3A is a schematic of the printed sheet and metal substrate.

The printed label 20, prior to application to the substrate 11 to form pet tag 10, is pre-assembled and comprises four necessary layers as shown in FIG. 3A. The layered pre-assembly of the labels 20 is a critical aspect of the present invention insofar as the labels 20 will be subjected to forces upon the top layer 22 and on the bottom adhesive layer 28 during the manufacturing process.

Specifically, during manufacturing of the tag 10, a compression force is applied to the top layer 22 by a hammer press 150. In addition, the substrate 11 is stamped on the bottom side, opposite the side to which the label 20 is applied, by an engraving stamp head 60. The impact of both the hammer press 150 and the engraving head 60 create deformity in the substrate 11 as a result of the stamping of the human readable indicia 16 onto the tag 10. The composition and thickness of the protective top layer 22 and the bottom adhesive layer 28 is of upmost importance and provides the necessary means to protect the machine readable indicia from deformation and damage during manufacturing of the tag 10 as well as during the use of being worn by a pet. Specifically, the label 20 of the invention, designed to protect the printed sheet 26, with printed machine readable indicia 30, from being damaged during the manufacturing process by the hammer press 150 and the engraving stamp head 60.

As discussed in more detail herein, the labels 20 are provided pre-printed with a QR code or other machine readable indicia and regularly spaced on a tape 52 wound onto a roll 50. Each printed label 20 actually comprises a top protective layer 22 with a transparent layer of adhesive 24 that binds the protective layer 22 to a printed sheet 26. A thick layer of aggressive adhesive 28 is provided on the bottom of the printed sheet 26 that will secure the label 20 to the substrate 11 as shown in FIG. 3A. In the most preferred embodiment of the present invention the protective coating 22 comprises Lexan® with a thickness between 0.001-0.010 inches, with the transparent adhesive layer 24 being between 0.001-0.002 inches thick. The indicia 30 is applied on a printed sheet 26 comprising a sheet of white polyester of thickness between 0.001-0.003 inches, such that the indicia 18 is visible and can be read by a device through the transparent adhesive 24 and protective layer 22 in the most preferred embodiment. While the inventor has specified the materials and specifications as to dimensions, however, other materials of alternative dimensions are contemplated, and the variation of such materials and dimensions shall not distinguish embodiments from the present invention to the extent they within the bounds of the claims of this application.

Figure 3B:
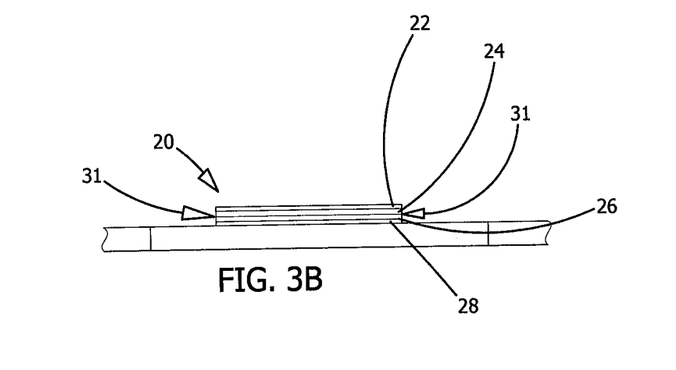
FIG. 3B is a schematic representation of the printed sheet affixed to the metal substrate.
Figure 3C:
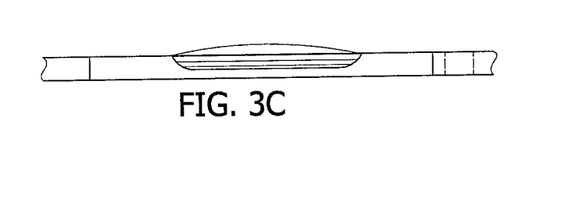
FIG. 3C is a schematic representation of the printed sheet being embedded into the metal substrate after application of stamp press force.
Figure 3D:
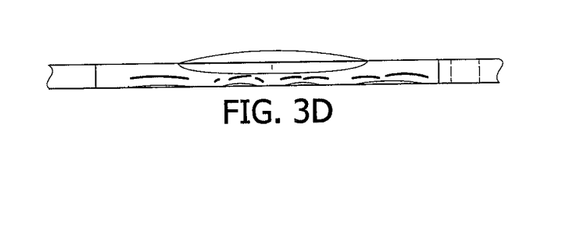
FIG. 3D is a schematic representation of the durable pet tag after forceful application of the stamp press providing human readable indicia.

The thick layer of aggressive adhesive 28 is provided on the bottom of the label 20 as shown in FIG. 3A and secures the label 20 face to face to the pet tag substrate 11 as shown in FIG. 3B. Once the label 20 is secured face to face to the substrate 11, an automated hammer press 150 (FIG. 1) applies a compression force to the label 20 (see FIG. 1) to embed the label 20 into the substrate 11 (see FIGS. 3C and 3D). The inventors herein found, through arduous and long research that the most reliable and longest life for a pet tag with machine readable indicia was achieved by pre-printing a label 20, applying it to a substrate 11 and then compressing the label 20 to embed it into the substrate 11 as shown in FIGS. 3C and 3D.

The present invention provides for the machine readable indicia 18 to be printed on material that is resistant to effects from heat, light, moisture and mechanical breakdown. In the most preferred embodiment of the present invention the material the printed layer 26, onto which indicia 18 is applied, comprises white polyester of a thickness in the range of 0.001-0.003 inches. The clear protective coating 22 and adhesive layer 24 provide the means for protecting the indicia 18 and the embedding of the label 20 into the metal substrate 11 provides the means for preventing peeling or separation of the label 20 as a result of the edge 31 of the label 20 being merged into the substrate 11. Specifically, compression of the label 20 into the substrate 11 with a hammer press 150 eliminates the vertical edge 31 and thereby eliminates damage to the label 20 from getting "hooked" and caught on jagged surfaces, like claws or teeth or fences or other sharp edges or points. It is a significant aspect of the present invention that the accessible vertical edge 31 of the label 20 is eliminated after the stamp press embeds the label 20 into the substrate 11. Damage to or separation of the label 20 at the edge 31 (FIG. 3B) is eliminated in this manner, the metal substrate 11 providing a protective enclosure around the label 20 after press stamping occurs and embedding of the label 20 occurs (FIG. 3C, 3D).

The pet tag 10 of the present invention is a departure from the prior art because it incorporates the machine readable indicia 18 on the first side 12 of the traditional, rugged pet tag that has been the gold standard in pet identification for decades. The durability of the deep stamping of human readable indicia 16 onto the other side 14 of the metal substrate 11 opposite the applied label 20 provides a solution to incorporate current technology without abandoning the systems and methods already in use. The practice of distributing pet tags 10 as part of the legal registration process and to comply with state laws is continued with the present invention, while also adding to the pet tag the state of the art technical database capabilities inherent in the use of QR codes or other machine readable indicia 18. To accomplish that, however, modifications and adjustments to the traditional manufacturing process of pet tags are necessary.

Specifically, it is necessary to assemble the pet tag 10 in a specific order of steps and in a way that merges the label 20 to the substrate 11 so that the deep mechanical stamping of the human readable indicia 16 does not interfere with or damage the label 20. To that end, the present invention contemplates that the multiple layer printed label 20 is pre-assembled and applied to the substrate 11 while the substrate 11 is flat and not deformed, allowing it to be effectively embedded into the substrate 11 upon application of the compression force at hammer press 150. Next, the human readable indicia 16 is deep stamped by a mechanical engraving stamp 60, with indicia plate 61, onto the side 12 of the substrate 11 opposite to the side on to which the label 20 has been applied.

The pet tag 10 of the present invention is generated by, first, creating a continuous roll 50 of preassembled labels 20 on a continuous nonstick tape 52. A roll 54 of substrate material 11 is provided that is unwound in the direction shown in FIG. 1 such that, as the label roll 50 is unwound in the direction indicated in FIG. 1, the labels 20 are merged onto the substrate material 11. Each label 20 is peeled away from the nonstick tape 52 and affixed to substrate material 11 as roll 54 is unwound (see FIG. 1). The movement depicted by arrow F in FIG. 1 is done at high speed and tightly controlled by registering the position of the label 20 on the substrate material 11. When label 20 is positioned below hammer press 150, the full compression force in the hammer press 150 is applied to the label 20 to embed it into the substrate material 11. The problematic edge 31 (FIG. 3B) of the label 20 is eliminated by embedding the label 20 into the substrate material 11. Next, a mechanical engraving stamp 60 imprints human readable indicia 16 on the bottom side 57 of the substrate 11. The indicia plate 61 provides a means for indexing the human readable indicia 16 such that each tag 10 has a "unique identifier" 17. The mechanical stamp 60 provides the advantage of the durable, reliable human readable indicia 18 being applied to the substrate 11 at high speed as opposed to slow, methodical etching or printing of indicia onto the substrate. To prevent damage to the label 20 and the machine readable indicia 18 printed on it, the label 20 is provided with the thick bottom layer of adhesive 28. The thick layer of adhesive 28 absorbs any deformity occurring in the substrate 11 as a result of being stamped from below by the engraving stamp at 60.

After both the machine readable indicia 18 on label 20 is applied and embedded on the top side 55 of the substrate material 11, and the opposing bottom side 57 of the substrate layer 11 is stamped with human readable indicia, to form two sided durable pet tags 20.

After application of the label 20 to the substrate 11, to the top side of the substrate 11, and pressing of the label 20 to embed it into the substrate material 11, followed by being stamped by mechanical engraving stamp 60, a punch press 62 is applied that punches through the substrate 11 to knock out each pet tag 10. The shape knocked out by the punch press 62 may be of various designs, shapes, polygons, circles, ovals, semicircles, or decorative designs such as a flower, a bell, the shape of a dog bone, and many others. Each tag 10 has a registration hole 70 which also provides the means for attaching the tag 10 to a pet collar 80.

Figure 4:
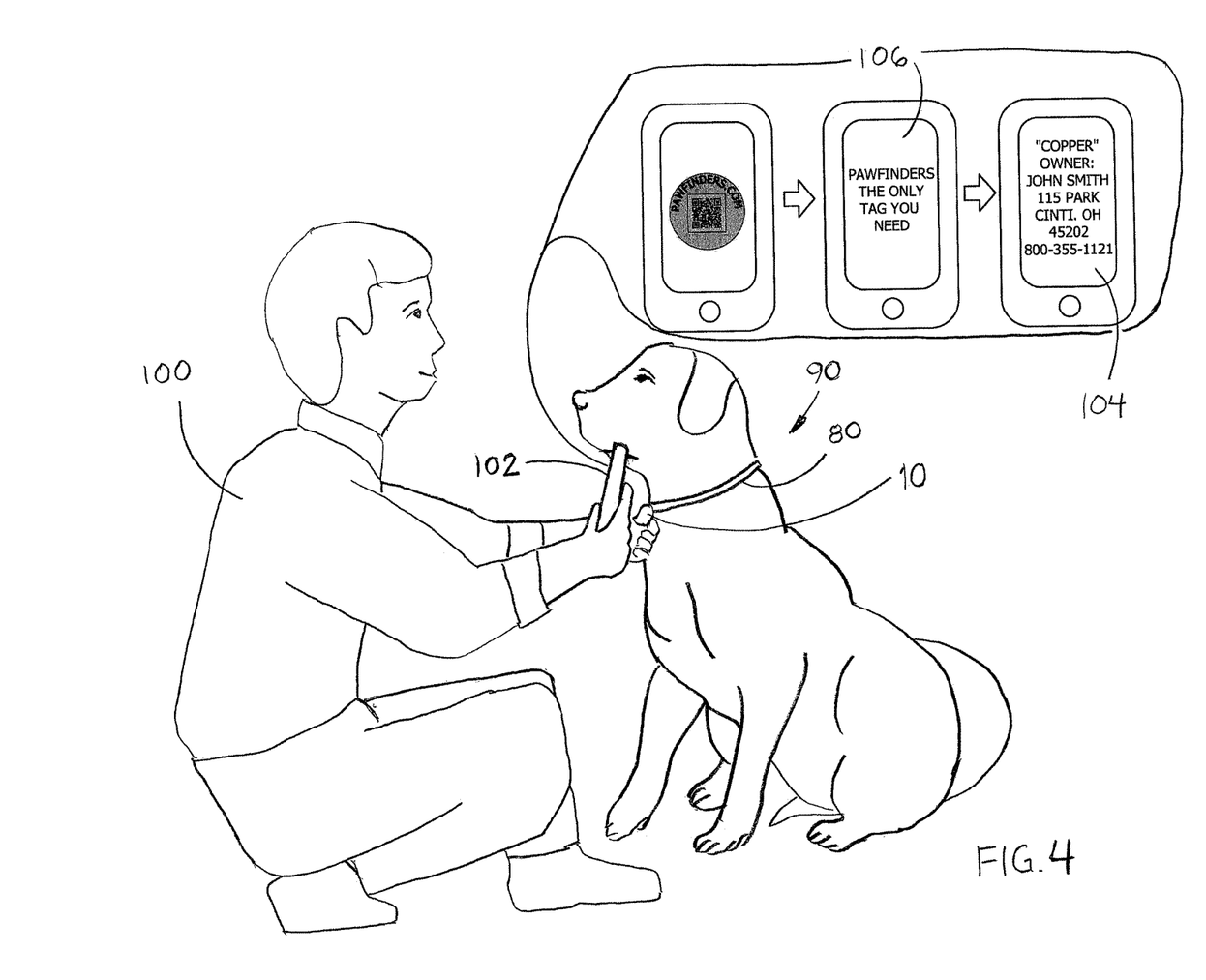
FIG. 4 is an illustration of a person using a smart phone and a machine readable QR code to access a database and procure information pertaining to the pet wearing the tag.

In use, the tag 10 is worn on a collar 80 by a pet 90 (See FIG. 4). The tag 10 is issued by the pet's veterinarian and is used to reflect legal compliance with any statute or ordinance governing pets, including, without limitation, Rabies Vaccines requirements, spaying or neutering, or other conditions. The tag 10 bears, on one side, human readable indicia 16 typically comprising the identity of the issuing veterinarian and a "unique identifier" 17 for the veterinarians recordkeeping. On the other side of the tag 10, machine readable indicia 18 comprising, without limitation, a quick recall (QR) code is provided on a label 20 that is embedded into the metal substrate 11. The inclusion of the QR code 18 on the tag 10, on the top side 12 opposite the human readable indicia 16 is a critical aspect of the present invention. The QR code 18 is well known by the consumer public to be readable by electronic devices, including without limitation smart phones, iPads, and the like, to automatically direct a user to a website. Specifically with respect to the present invention, upon issuance of the two-sided pet tag 10, the pet owner is provided instructions to use the QR code 18 to go to a website and register information about the pet into a database. The information registered by the pet owner may include pet name, owner name, address, phone number, veterinarian name, vaccination records, etc. If the pet becomes lost while wearing the two-sided tag 10, a "finder" 100 of the pet 90 will be able to use the technology incorporated in the tag 10 to get the pet 90 back to its owner. Specifically, the "finder" 100 can recognize the presence of the QR code 18 on the tag 10. As soon as the "finder" 100 uses a smart device 102 to read the QR code 18 the "finder" 100 is provided the pet's information maintained at the website 106, specifically the owner information previously input by the pet owner. The pet owner information 104 (name, address, phone number, etc.) is accessed at the website and communicated back to the "finder" 100 with the electronic reader device 102 where it is displayed so that the "finder" 100 can contact the owner for return of the pet 90. In this way, the reunion of a lost pet is quick and easy and does not require contacting the veterinarian listed on the tag.

The dual sided pet tag 10 of the present invention with human readable indicia 16, including a "unique identifier" 17, satisfies the traditional requirements such that a veterinarian procures pet tags 10 in bulk whereby, upon applying a vaccination or just seeing a pet for the first time, the veterinarian can issue the tag 10 to be worn by the pet immediately. There is no need to customize or individualize a tag for the pet, which is the way veterinarians have issued pet tags for decades. Thus, the long-standing practice of the veterinarian to issue pet tags immediately is continued. In addition, though, the present inventive pet tag 10 also includes, on the side opposite the human readable indicia 16, a machine readable indicia (QR code) 18. By providing this QR code 18 on the pet tag 10, and providing a website and database for receiving and storing pet owner information, as well as providing an application program for smart devices to access the database and website, the present invention addresses the biggest drawback associated with the prior art tags and issuance by veterinarians. Specifically, in light of the present invention, when a pet becomes lost, the "finder" 100 will now be able to access the website to get owner information and no longer will need to call the veterinarian to return the pad to the owner. The "finder" 100 is able to access the owner information by using the smart device to read the QR code 18, and thereby the pet is returned without delay and the veterinarian does not need to be involved and will not receive phone calls at all hours of the day because their number is provided on the tag 10.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto

The invention claimed is:
1. A pet tag comprising:
a durable, substantially flat metal substrate;
machine readable indicia comprising a QR code on a multiple layer label affixed to said metal substrate by an aggressive adhesive and subsequently subjected to a compression force to embed said label into said substrate, wherein said multiple layer label comprises a printed polyester sheet having a top side and a bottom side and a thickness between 0.001 and 0.0025 inches, a second layer of said aggressive adhesive having a thickness between 0.0010 and 0.0030 inches, and a protective layer of a sheet of Lexar having a thickness of between 0.002 and 0.005 inches secured to said top side of said printed sheet with a transparent layer of adhesive having a thickness of between 0.0010 and 0.0015 inches wherein said label is manufactured prior to being applied to said metal substrate wherein said protective layer is affixed to said printed sheet with said transparent adhesive and the bottom side of said printed sheet has aggressive adhesive pre-applied such that said label is removed from a non-stick roll of tape and affixed to said metal substrate in a high-speed manufacturing step.

2. A durable pet tag comprising:

a substantially flat metal substrate having a first side and second side;

machine readable indicia comprising a QR code on a multiple layer label, said label affixed to said substrate by a layer of an aggressive adhesive and being subjected to a compression force embedding said label into said substrate, said label further comprising a first polyester layer having a top side and a bottom side and a thickness between 0.001 and 0.0025 inches, and a second layer comprising said aggressive adhesive having a thickness of between 0.0010 and 0.0030 inches, said label further comprising a protective layer of a sheet of Lexan having a thickness of between 0.002 and 0.005 inches, said protective layer secured to said top side of said polyester layer said protective layer with a transparent layer of adhesive having a thickness of between 0.0010 and 0.0015 inches wherein said label is manufactured prior to being applied to said metal substrate wherein said protective layer is affixed to said first layer with said transparent adhesive and the bottom side of said label has said aggressive adhesive applied such that said label is removed from a nonstick roll and affixed to said metal substrate in a high-speed manufacturing step.

3. The durable pet tag as set forth in claim 2 wherein said label is removed from a roll and applied to said metal substrate prior to said compression force embedding said label into said metal substrate.

4. The durable pet tag as set forth in claim 3 wherein said second side is stamped with human readable indicia.

5. A method for producing pet tags comprising the steps of:

Providing sheet metal substrate on a continuous roll for threading through a tag producing machine;

Providing pre-printed labels on a continuous roll for application to a metal substrate;

Pressing said pre-printed label onto said substrate thereby embedding said label into said metal substrate;

Stamping human readable indicia onto said substrate on a side opposite said label; and Punching out an individual pet tag comprising a label, said pet tag bearing human readable indicia on one side and an embedded label on opposing side.

* * * * *